United States Patent [19]

Sunaga et al.

[11] Patent Number: 4,829,504

[45] Date of Patent: May 9, 1989

[54] APPARATUS FOR REPRODUCING SIGNALS RECORDED ON DISCS

[75] Inventors: Takeji Sunaga, Atsugi; Junichi Nagahisa, Zama, both of Japan

[73] Assignee: Victor Company of Japan, Ltd., Kanagawa, Japan

[21] Appl. No.: 106,789

[22] Filed: Oct. 13, 1987

[30] Foreign Application Priority Data

Oct. 13, 1986 [JP] Japan ................................ 61-156399

[51] Int. Cl.⁴ ........................ G11B 3/10; G11B 17/04; G11B 25/04

[52] U.S. Cl. .................................. 369/75.2; 369/77.2; 369/292

[58] Field of Search .................... 369/75.2, 77.2, 77.1, 369/280, 292, 291

[56] References Cited

U.S. PATENT DOCUMENTS 4,627,037 12/1986 Tamaru et al. ..................... 369/75.2
4,710,910 12/1987 Ejiri .................................... 369/75.2
4,730,296 3/1988 Urata et al. ........................ 369/77.2
4,731,775 3/1988 Katsuyama et al. ............... 369/75.2
4,731,776 3/1988 Ishii et al. .......................... 369/77.2

*Primary Examiner*—Steven L. Stephan
*Attorney, Agent, or Firm*—Holman & Stern

[57] ABSTRACT

A disc reproducing apparatus has: a loading-ejecting mechanism mounted on a fixed base and having a sliding member for engaging with a case containing a compact disc, in which mechanism the case is loaded manually into a specific loaded position and, after reproduction, is ejected by a movement of the sliding member; a disc reproducing device and a disc driving device mounted on a movable base pivotally connected to the fixed base and being drivable to a reproducing position to bring the two devices into and out of their reproducing positions relative to the disc in loaded position; a locking mechanism with detection means for locking the sliding member when the case has been correctly loaded, the detection means thereupon transmitting a signal for driving the movable base into its reproducing position; and an unlocking mechanism operating with movable base driving means at the time of case ejection to unlock the sliding member.

5 Claims, 10 Drawing Sheets

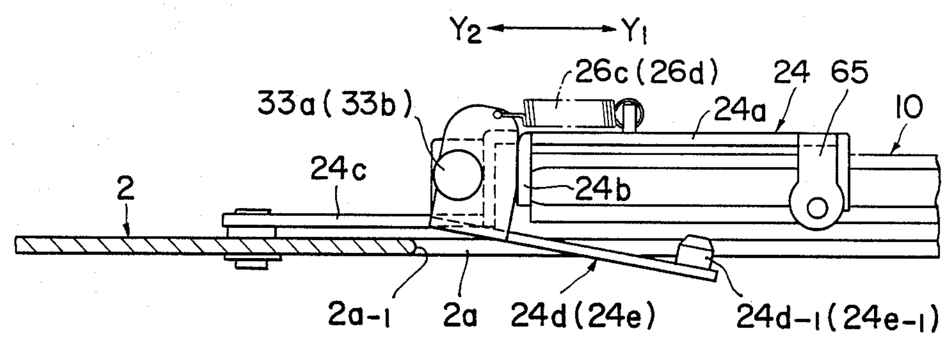
F I G. 6A
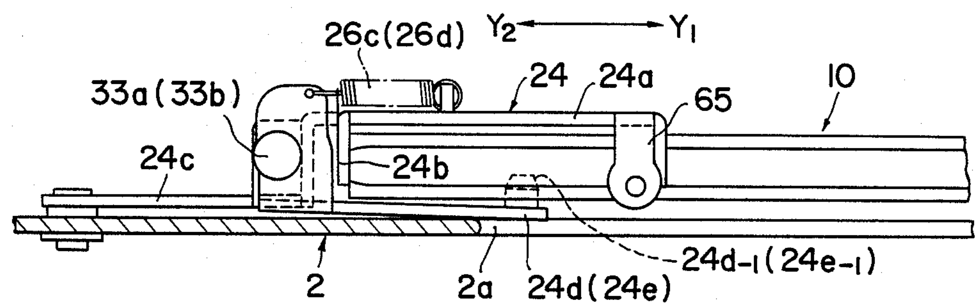
F I G. 6B
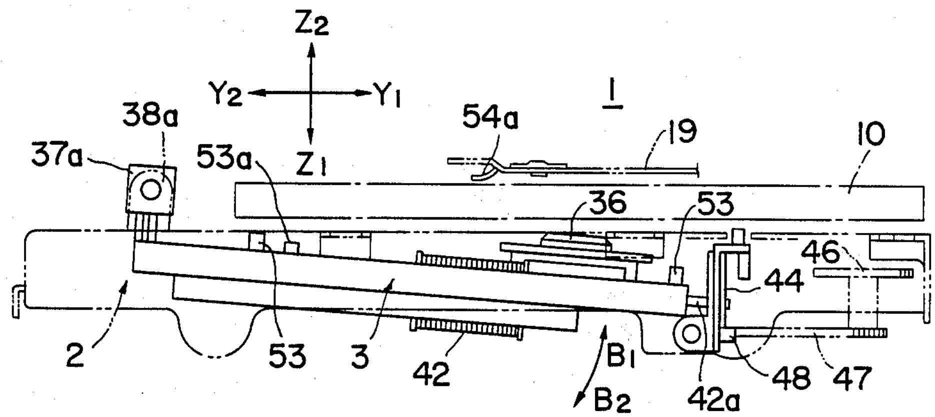
F I G. 7

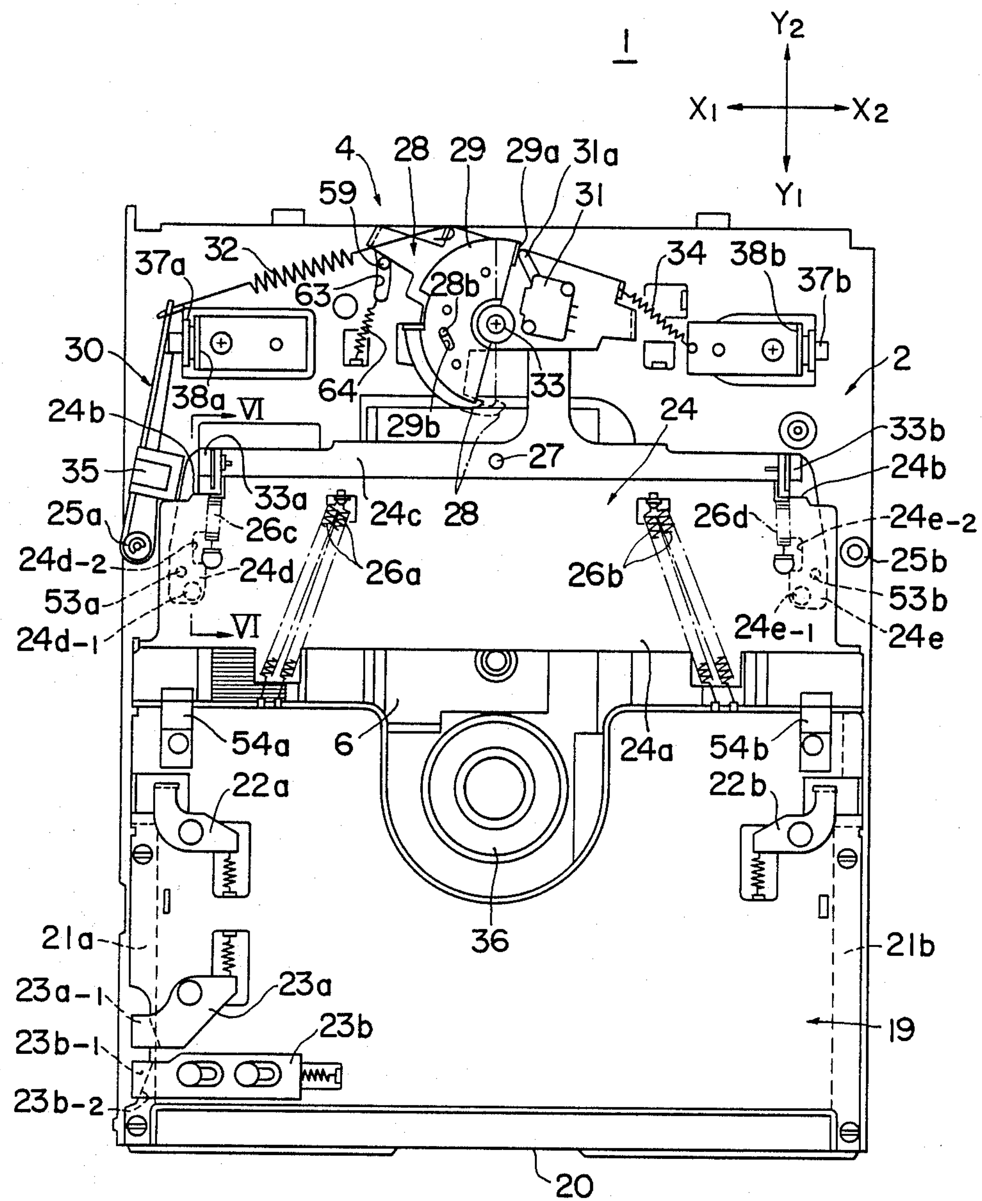
F I G. 13

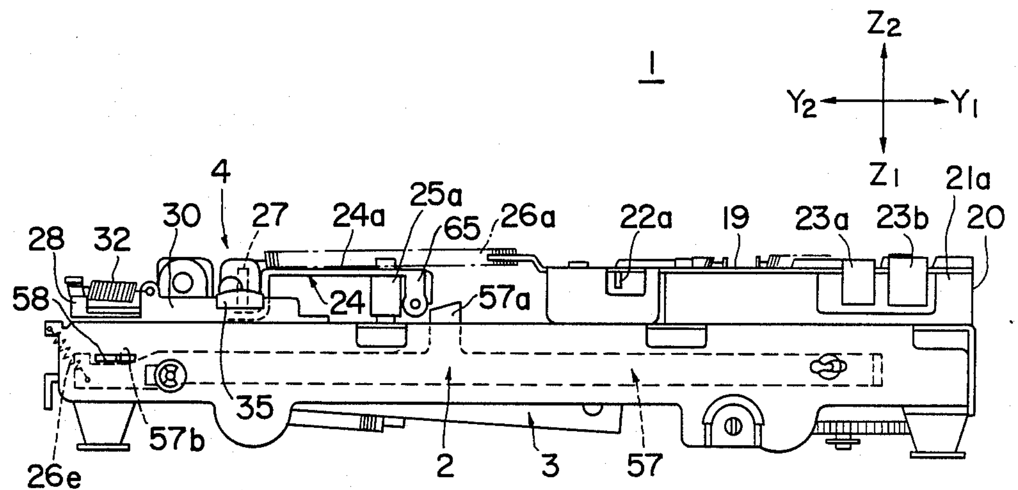
F I G. 14
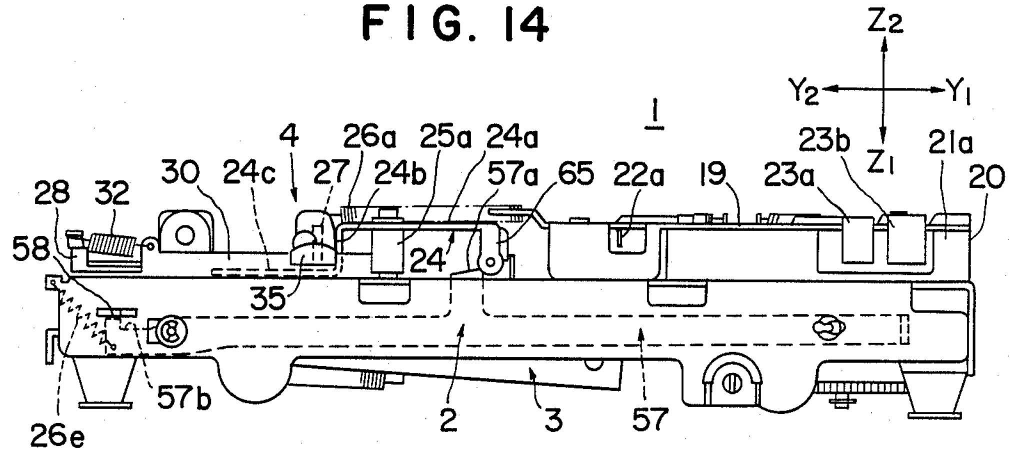
F I G. 15
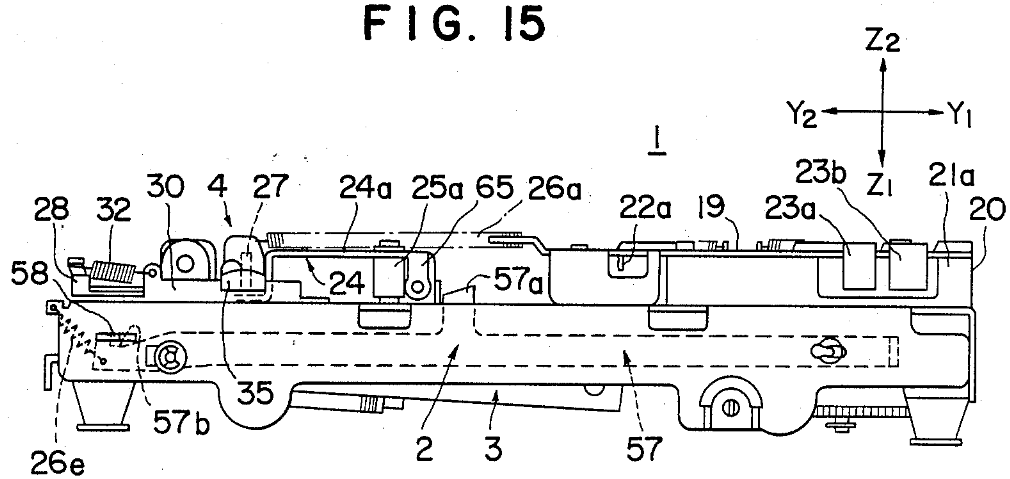
F I G. 16

APPARATUS FOR REPRODUCING SIGNALS RECORDED ON DISCS

BACKGROUND OF THE INVENTION

This invention relates generally to electromechanical apparatuses for reproducing discs, more precisely, reproducing from discs information signals recorded thereon. More particularly, the invention relates to a disc reproducing apparatus (hereinafter referred to as a reproducing apparatus or simply apparatus) into or out of which a disc can be loaded or ejected positively and accurately, and in which erroneous insertion of a disc can be prevented.

A reproducing apparatus into which a compact disc on which an information signal has been recorded is loaded and the signal thus recorded is reproduced from this disc by means of a light (optical) pickup is known. Recently, in order to protect compact discs and to improve their handling, a method wherein each compact disc is placed in a case, and the disc together with the case is loaded into a reproducing apparatus and reproduced has been proposed.

Furthermore, for installation within a disc reproducing apparatus of this character and operating to load the case with disc into a specific position within the apparatus and to eject the same, a loading-ejecting mechanism of the so-called full-autoloading type has been used. More specifically, this mechanism is so constituted that, when a case is inserted to some extent into the apparatus, detection means within the apparatus detects this initial insertion and starts the loading-ejecting mechanism, which thereupon operates fully automatically to grasp, guide, and convey the case into its correct loading position.

Reproducing apparatuses of this known type, however, have not been entirely free of problems. For example, because the case loading-ejecting mechanism is made fully automatic, if an object other than a case is inserted by mistake into the apparatus, the loading-ejecting mechanism will start, and the reproducing apparatus will assume its reproducing state, even though a case has not been actually inserted. Another problem is that, in the event that the insertion of a wrong disc has been noticed by the operator, who thereupon hastily tries to pull out the case, but the insertion of the case is detected by the detection means within the apparatus, and the loading-ejecting mechanism operates and holds the case in an improper position within the apparatus, whereby there arises the possibility of damaging the case or the reproducing mechanism such as the turntable. Furthermore, if the case is not correctly inserted, that is for example, if the case is inserted in an askew state, the loading-ejecting mechanism will operate, and defective operation such as failure of the compact disc to be loaded in its correct position or collision of the case with a part such as the frame of the loading-ejecting mechanism due to the loading action will occur, whereby smooth loading and ejecting cannot be carried out.

SUMMARY OF THE INVENTION

Accordingly, it is an object of this invention to provide a disc reproducing apparatus in which the above described problems are solved by an organization and operation wherein the insertion of the case is carried out manually until the case reaches its locking position and the loading-ejecting operation thereafter is carried out automatically.

According to this invention there is provided an apparatus for reproducing signals recorded on discs, comprising: a loading-ejecting mechanism which is provided on a fixed base and has a sliding member for engaging with a case wherein a disc is accommodated, and in which, for reproducing, said case is loaded into a specific loaded position by manual insertion and, for ejection of said case after reproduction, said case is ejected by a movement of said sliding member; movable base driving means for actuating a movable base having disc reproducing means and disc driving means and pivotally supported relative to said fixed base, said movable base driving means operating, at the time of loading said case containing said disc, to actuate said movable base in pivotal displacement to a specific reproducing position thereby to cause said disc reproducing means to confront the disc within the case and to cause said disc driving means to engage the disc and, at the time of ejection of the disc, to actuate the movable base in pivotal displacement to withdraw from said specific reproducing position; locking and locked state detection means operating, when the case reaches said specific loaded position, to engage and lock said sliding member thereby to prevent displacement of the case and having detection means operating to detect the state wherein the case has been thus positioned and locked in said specific loaded position and then to generate and transmit a starting signal to said movable base driving means; and unlocking means operating in unison with said movable base driving means at the time of case ejection to unlock said sliding member from the locked state thereof due to said locking and locked state detection means.

The nature, utility, and further features of this invention will be more clearly apparent from the following detailed description with respect to a preferred embodiment of the invention when read in conjunction with drawings, briefly described below.

BRIEF DESCRIPTION OF THE DRAWINGS

In the accompanying drawings:

FIGS. 6(A) and 6(B) are left side views in section taken along the plane indicated by line VI—VI in FIG. 1 as viewed in the arrow direction and show a lock pin out of and in a lock hole, respectively, in the case;

FIGS. 7 and 8 are partial left side views for a description of the movements of a movable base of the apparatus;

FIG. 13 is a top plan view showing the state of the apparatus from which a case has been ejected;

FIG. 14 is a left side view of the apparatus shown in FIG. 13;

FIG. 15 is a left side view similar to FIG. 14 indicating the state after a pin provided on a slider has pressed against a projecting part of an unlocking lever; and FIG. 16 is a similar left side view indicating the state wherein the unlocking lever is actuating a cancelling lever.

Figure 1:
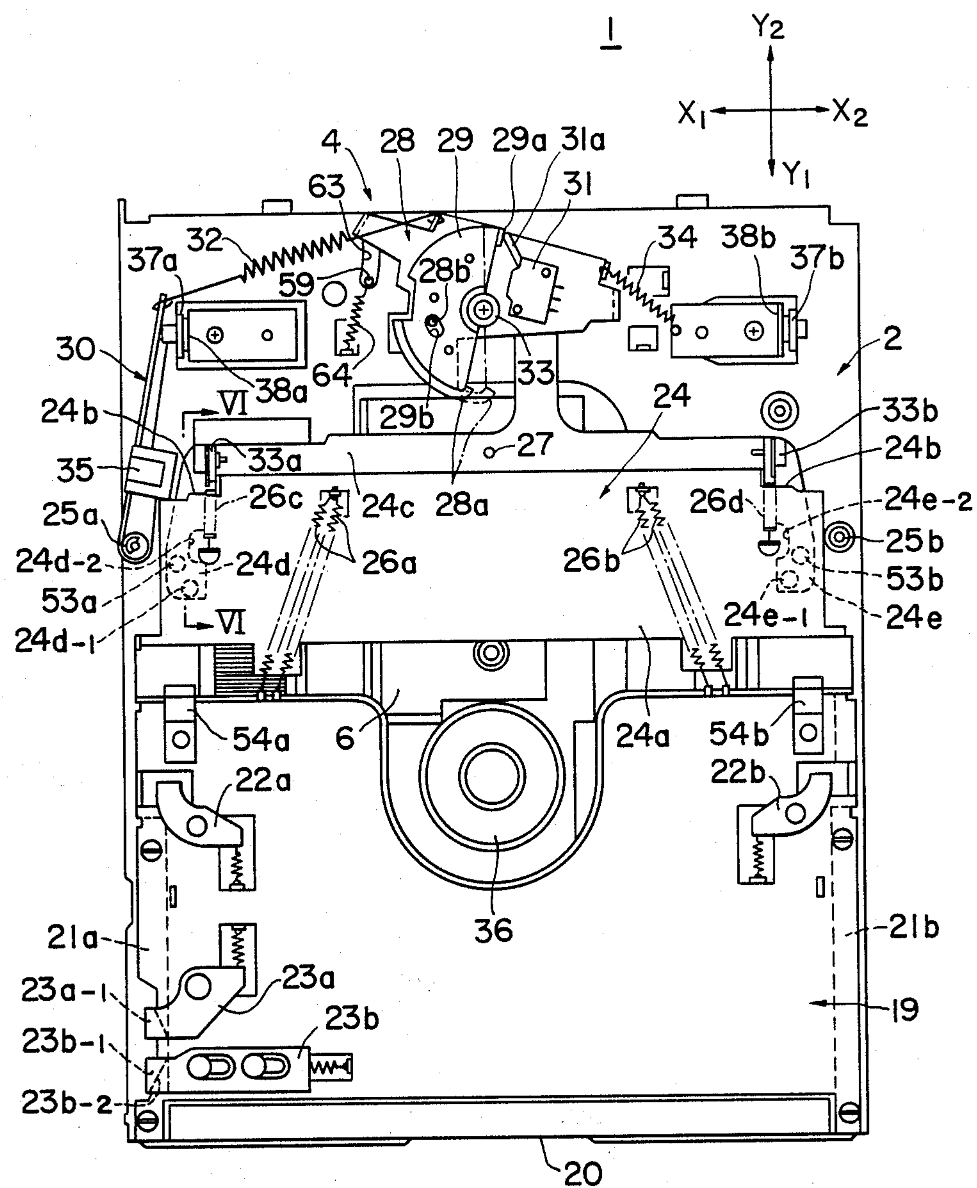
FIG. 1 is a top plan view of one example of the reproducing apparatus according to this invention.

Throughout the following description, directions in three dimensions are indicated by words such as left, right, forward, rear, upper, and lower in conjunction with coordinate axes shown in the drawings: $X_2$-$X_1$ respectively indicating left and right directions; $Y_1$-$Y_2$ respectively indicating forward and rearward directions; and $Z_1$ and $Z_2$ respectively indicating downward and upward directions.

DETAILED DESCRIPTION OF THE INVENTION

Figure 2:
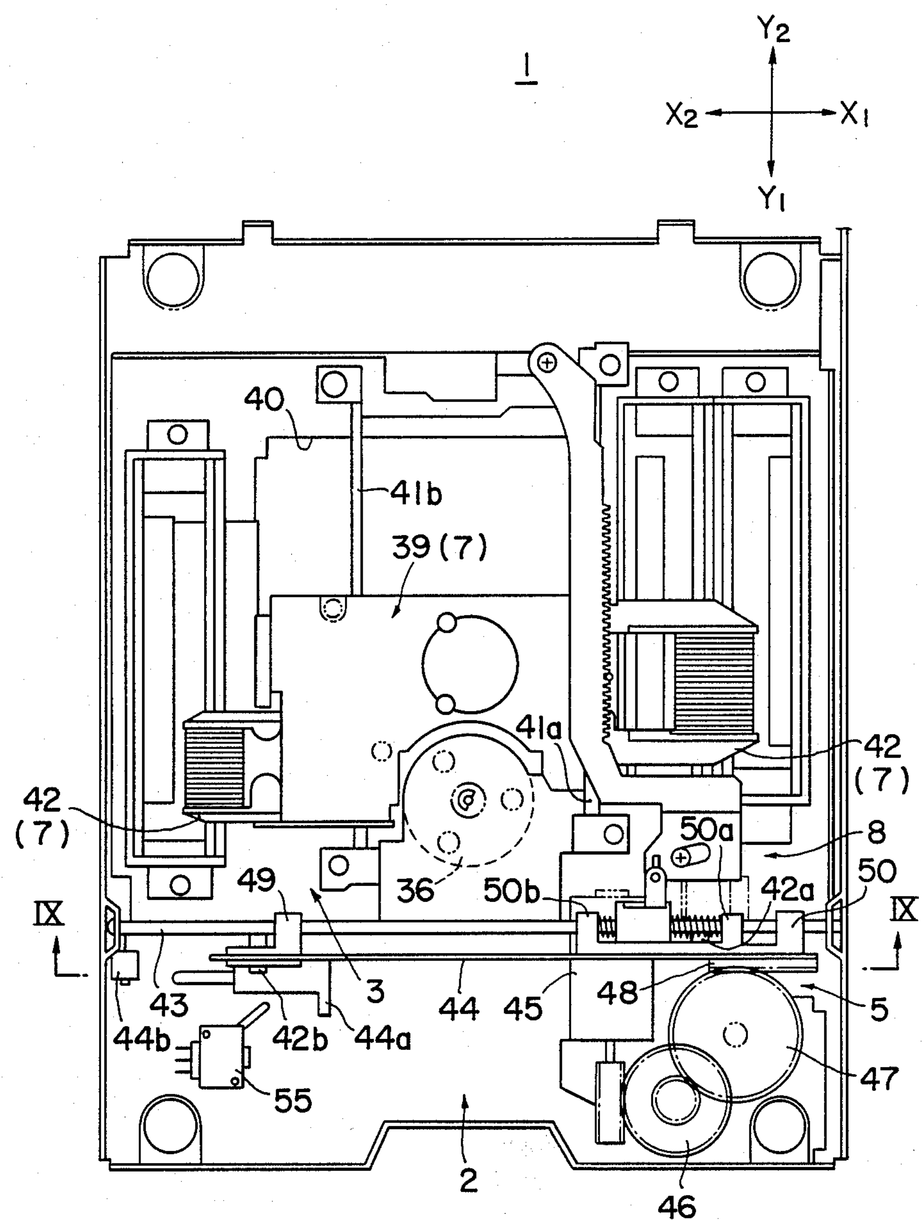
FIG. 2 is a bottom view of the same apparatus.
Figure 3:
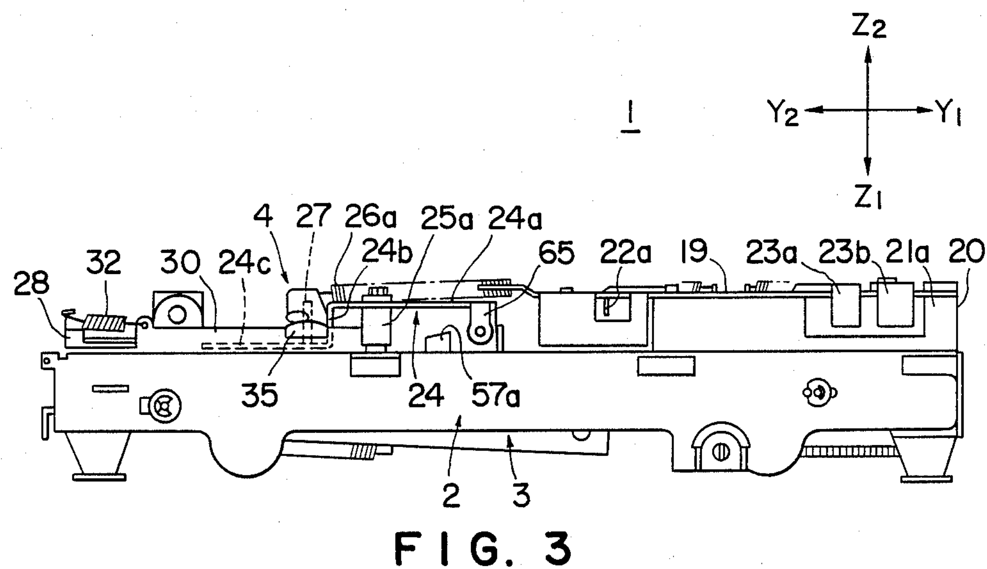
FIG. 3 is a left side view of the same apparatus.
Figure 4A:
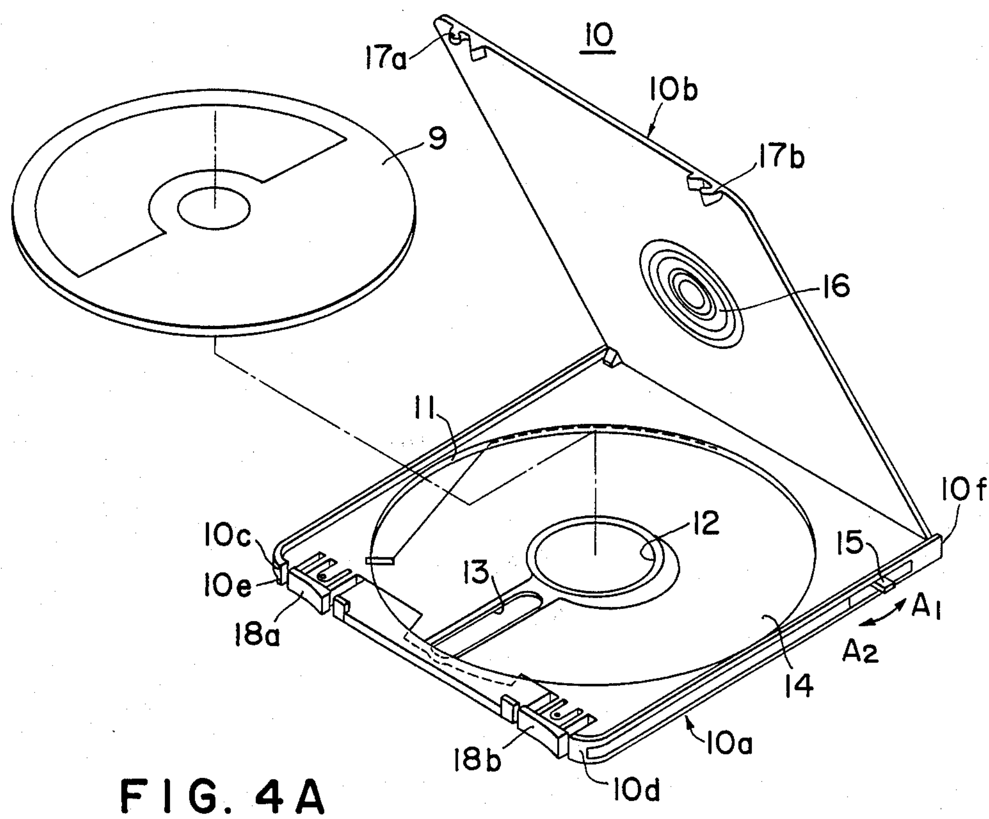
FIG. 4(A) is a perspective view of a compact disc and case for accommodating the compact disc and being inserted into the apparatus of the invention.

Referring first to FIGS. 1, 2 and 3, the example of a disc reproducing apparatus according to this invention illustrated therein has, as essential parts, a stationary or fixed base 2, a movable base 3 movably supported relative to the fixed base 2, a driving mechanism 5 for actuating the movable base 3, a locking mechanism 4, a light (optical) pickup 6, a pickup actuating mechanism 7, and a mechanism for controlling displacement of the pickup (hereinafter referred to as displacement control mechanism), all formed and interrelatedly assembled as described hereinafter. The assembled reproducing apparatus 1 is adapted to receive a case 10 loaded thereinto and accommodating a compact disc 9 as shown in FIG. 4(A) and to reproduce a signal recorded on the compact disc 9.

The construction of the case 10 to be loaded into the reproducing apparatus 1 will first be described with reference to FIG. 4(A). This case 10 comprises a case body **10*a* in the form of a shallow rectangular tray with a circular central accommodation recess 11 for accommodating a compact disc 9 and a flat case lid 10*b* of rectangular shape hinged along one edge thereof to one edge of the case body 10*a* to swing from an opened position to a closed position, in which the case lid 10*b* fully closes the case body 10*a* and to revolvably accommodate a compact disc 9 inserted in the accommodation recess 11**.

The recess 11 has a circular planar bottom provided at its center with an insertion opening 12 through which a turntable for rotating the compact disc 9 can be inserted. A slot opening 13 is also formed through the bottom of the recess 11 at a position to confront the optical pickup 6 when the case 10 is loaded into position in the reproducing apparatus 1. Except at the time of reproduction, this slot opening 13 is closed by a thin shutter 14 disposed flat against the bottom of the recess 11. (In FIG. 4(A), the slot opening 13 is shown in opened its state.) The shutter 14 in closed position therefore prevents infiltration of dust and other contaminants into the case 10. This shutter is actuated in its closing and opening movements by actuation of a shutter lever 15 at one side (edge) part of the case body **10*a***.

The case lid **10*b* is provided on its inner side with a stabilizer 16 at a central position for confronting the turntable insertion opening 12 when the lid 10*b* is closed. The case lid 10*b* is further provided at spaced-apart positions on its edge opposite to its hinged edge with catches 17*a* and 17*b*, which, when the lid 10*b* is closed, engage with respective snap-locking mechanisms provided at the edge of the case body 10*a* oppositely remote from the hinge line of the lid 10*b*. These snap-locking mechanisms can be unlocked by pressing inward push buttons 18*a* and 18*b*. After a compact disc 9 has been laid in the recess 11 in the bottom of the case body 10*a*, the case lid 10*b* is closed and snapped shut, and the case 10 in this state is loaded into and ejected from the reproducing apparatus 1**.

The upper face of the fixed base 2 of the apparatus 1 at its front portion is covered by a loading cover 19 having along its front edge (lower edge as viewed in FIG. 1) an insertion slot 20. Through this insertion slot 20, the above described case 10 is inserted into the apparatus 1 in the rearward ($Y_2$) direction while being guided and held by loading rails **21*a* and 21*b* provided at opposite left and right sides of the interior of the loading cover 19** and extending in the $Y_2$-$Y_1$ direction.

On the upper face of the loading cover 19, at left and right sides thereof, are pivotally supported error prevention levers **22*a* and 22*b*, which permit the insertion of the case 10 only when the case 10 is correctly inserted, and which arrestingly engage the case 10 when it is being inserted incorrectly thereby to prevent its erroneous insertion. Also on the upper face of the loading cover 19, at a forward left part thereof, an opening lever 23*a* and a shutting slider 23*b* are movably supported at positions to engage with the aforedescribed shutter lever 15 of the case 10, whereby the shutter 14 of the case 10** can be actuated in its opening and shutting movements.

Figure 4B:
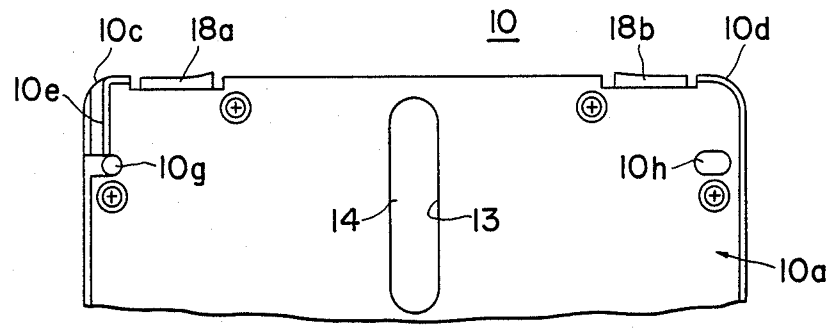
FIG. 4(B) is a partial bottom view of the leading-edge part of the same case.

As shown in FIGS. 4(A) and 4(B), the two corners **10*c* and 10*d* at the ends of the leading edge of the case 10 in its state of insertion into the apparatus 1 are rounded or curved. A groove 10*e* is formed at the lower part of one of these curved corners 10*c* as shown in FIG. 4(B), which shows the bottom face of the case 10. The remaining corners of the case 10, that is, the corners at the ends of the trailing edge of the case 10 with respect to the direction of insertion thereof, are not rounded but are sharp corners 10*f*** formed by the right-angle intersections of the side edge faces and the face of the trailing edge.

Figure 5:
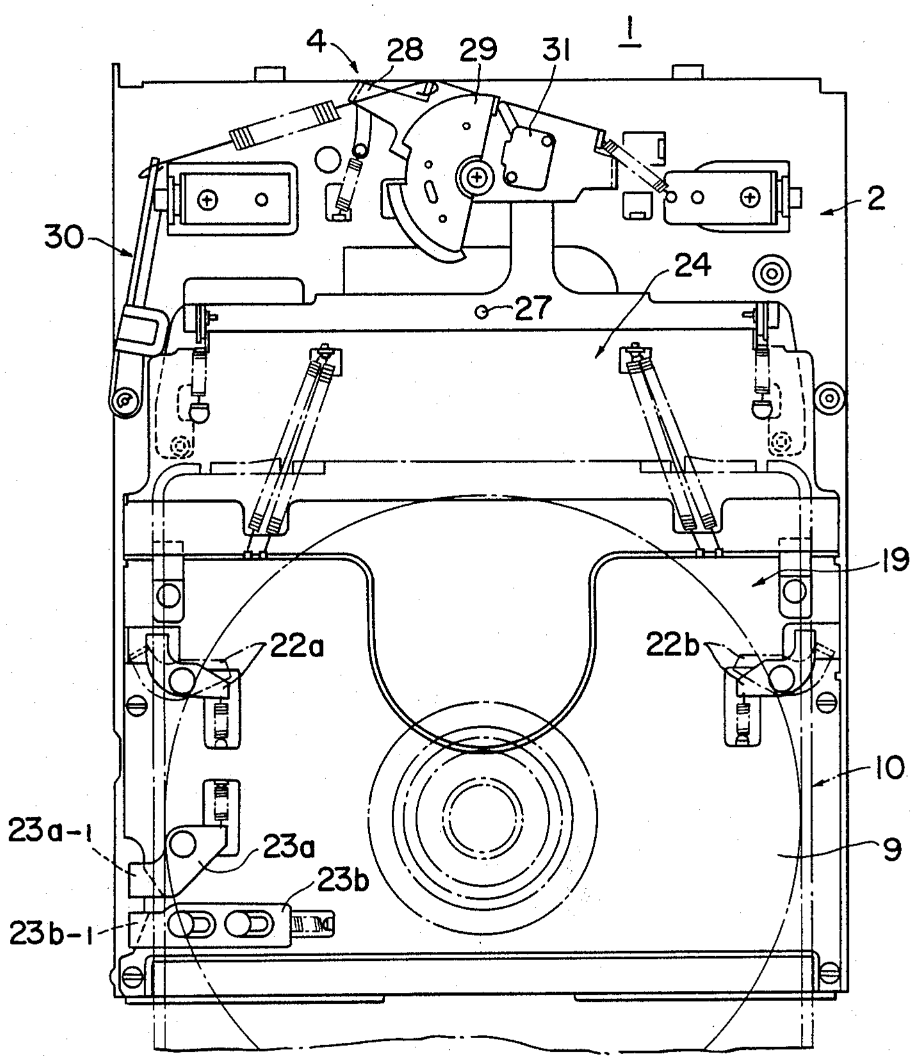
FIG. 5 is a top plan view for a description of the actions of error prevention levers.

The above described error prevention levers **22*a* and 22*b* are so positioned as to engage the upper part of the leading edge of the case 10 being inserted. Moreover, in the case where the parts thus engaged are curved, these levers 22*a* and 22*b* rotate smoothly in a retracting movement in accompaniment with the insertion movement of the case 10 as indicated in FIG. 5 (in which the retracted levers 22*a* and 22*b* are shown in single-dot chain line), thereby permitting the insertion of the case 10. However, in the case where the parts thus engaged are not curved, they are engaged and arrested by the levers 22*a* and 22*b*, whereby the insertion of the case 10** is prevented.

Therefore, when the insertion of the case 10 is begun with the case in up-side-down state, the groove **10*e* of the case 10 is engaged and arrested by the error prevention lever 22*b*, whereby further insertion of the case 10 is prevented. When the case 10 is inserted with its leading edge and trailing edge in reversed state, its sharp corners 10*f* are engaged and arrested by the levers 22*a* and 22*b*, whereby the case 10 is prevented from entering further. Thus erroneous insertion of the case 10** is positively prevented.

On the other hand, the opening lever 23a is rotatably supported on the loading cover 19 at its forward left part, and the shutting slider 23b is slidably mounted in a manner permitting it to be slidable in the $X_1$-$X_2$ directions. The opening lever 23a and the shutting slider 23b respectively have working ends $23_{a-1}$ and $23_{b-1}$ projecting in the $X_1$ direction and are biased by respective springs to project these working ends in the $X_1$ direction. These working ends $23_{a-1}$ and $23_{b-1}$ are adapted to engage with the aforedescribed shutter lever 15 of the case 10, the working end $23_{a-1}$ of the opening lever 23a projecting further relative to a case 10 being inserted than the working end $23_{b-1}$ of the shutting slider 23b.

Referring again to FIG. 4(A), the shutter lever 15 of the case 10 is adapted to undergo rotational displacement in the arrow directions $A_1$-$A_2$, corresponding to $Y_1$-$Y_2$ of the reproducing apparatus 1. Actuating this shutter lever 15 in the $A_1$ direction causes the shutter 14 to open the aforedescribed slot opening 13, while actuating the lever 15 in the $A_2$ direction causes the shutter 14 to shut the slot opening 13. The shutter lever 15 projects further outward from the side face of the case body 10a when it is in the $A_1$ position than when it is in the $A_2$ position. In the $A_2$ position, the outer tip of the shutter lever 15 is flush with the side face of the case body 10a.

When the case 10 is to be inserted into the reproducing apparatus 1, its shutter 14 is in its shut state, whereby the shutter lever 15 is in its position $A_2$ of small projection. When the case 10 in this state is inserted into the reproducing apparatus 1, the shutter lever 15 does not engage with the working end $23_{b-1}$ of the shutting lever 23b of relatively small projection but engages with the working end $23_{a-1}$ of the opening lever 23a of relatively large projection. Accordingly, as the case 10 is further inserted, its shutter lever 15 is actuated relatively toward the $A_1$ direction, whereby the slot opening 13 is opened.

On the other hand, when the case 10 is being taken out of the apparatus 1, since the shutter lever 15 is at the $A_1$ position of relatively large projection, it engages with the working end $23_{b-1}$ of the shutting lever 23b as the case 10 in this state is drawn out in the $Y_1$ direction. As the case 10 is thus drawn out further, the shutter lever 15 is thus actuated in the $A_2$ direction, thereby causing the shutter 14 to shut the slot opening 13. Also when the case 10 is inserted in the $Y_2$ direction with its shutter 14 in the opened state, that is, with the shutter lever 15 in its state of relatively large amount of projection, the case 10 can be loaded into the apparatus 1 as the shutter lever 15 slides in contact with and past the shutting slider $23_{b-2}$ and, moreover, as the shutter lever 15 cause the shutting slider 23b to move in the $X_1$ direction.

Returning to FIG. 1, at the rear part or part toward the $Y_2$ direction of the loading cover 19 is provided a slider 24, which is in the form of a joggled plate comprising a horizontal upper plate part 24a and a horizontal lower plate part 24c joined integrally by an upright web part 24b. This slider 24 is so supported that it is movable in the $Y_1$-$Y_2$ direction relative to the fixed base 2 of the apparatus 1, being guided by rollers 25a and 25b provided on the fixed base 2 near the left and right sides thereof. Coil springs 26a and 26b stretched between the loading cover 19 and the upper plate part 24a continually, bias the slider 24 in the $Y_1$ direction.

When the case 10 is inserted into the apparatus 1 and slides along the interior of the loading cover 19, it abuts and is pressed against the web part 24b of the slider 24. Consequently, the slider 24 is displaced together with the case 10 in the $Y_2$ direction counter to the elastic force of the coil springs 26a and 26b. When the case 10 has been thus inserted to its correct loaded position, a lock pin 27 imbeddedly fixed to the central part of the lower plate part 24c of the slider 24 near the web part 24b engages with the aforedescribed lock mechanism 4, thereby locking the slider 24 in place. The above described rollers 25a and 25b guide the slider 24 and at the same time also contact the left and right sides of the case 10 being inserted to guide the same.

The lock mechanism 4, constituting an important element of this invention, has as its essential parts a lock lever 28, a switch lever 29, a set lever 30, a switch 31, and a set spring 32. When the lock pin 27 is engaged by a latch part 28a formed at one peripheral part of the lock lever 28, the slider is locked by the lock mechanism 4, whereby the case 10, that is, the compact disc 9 encased therein, is positioned and loaded in its correct loaded position within the apparatus 1.

The lock lever 28 is rotatably supported on a pivot shaft 33 fixed uprightly on the fixed base 2, and above its upper face the switch lever 29 and the switch 31 are mounted. The switch lever 29 is a plate member of approximately semicircular shape in plan view and is rotatably supported on the pivot shaft 33, whereby the switch lever 29 is capable of slidingly rotating on the lock lever 28. The switch 31 is fixedly mounted on the right-hand part of the lock lever 28 and has a switch arm 31a in engagement with a projection 29a formed on a peripheral part of the switch lever 29.

The lock lever 28 is continually urged by a tension spring 34 to rotate in the clockwise direction, while the switch lever 29 is urged by a pressing force exerted by the switch arm 31a to rotate in the counterclockwise direction. However, these rotations are restricted at a specific position by the engagement between a projection 28b formed on the lock lever 28 and a slot 29b formed in the switch lever 29. The latch part 28a is so formed that it projects somewhat beyond the side edge part of the switch lever 29 when the above described parts are in the above stated state.

Furthermore, the switch 31 is so adapted that its switch arm 31a tends to swing toward the left. When the switch arm 31a is swung against this tendency toward the right, the switch 31 is closed. The set lever 30 is pivotally supported on the aforementioned roller 25a, and, between its distal end and a peripheral part of the lock lever 28, the set spring 32 is stretched. The set lever 30 is provided at an intermediate part thereof with a contacting part 35 for being contacted and pressed by the case 10 being inserted into the apparatus 1.

The lock mechanism 4 is shown in its unlocking state in FIG. 1, and in this state, the slider 24 will not be locked even if it is moved in the $Y_2$ direction.

More specifically, in the state of the apparatus 1 wherein the case 10 has not been inserted, the set lever 30 is free to rotate, and therefore the lock lever 28 is in a position to which it has been rotated clockwise by the spring 34. Consequently, the latch part 28a is in a state of retraction leftward from the path of movement (in the $Y_2$ direction) of the lock pin 27 accompanying the movement of the slider 24, and the lock pin 27 cannot be locked by the lock mechanism 4.

In this state of the apparatus 1 wherein the case 10 has not been inserted, there is no possibility of the slider 24 being locked even if it is caused to move by an outside force applied to the apparatus 1 or even in the event that a bar-like object is thrust into the insertion slot 20 by a prankish child, for example, whereby the slider is pressed in. Thus, placing of the reproducing apparatus 1 in its state for reproducing in spite of the absence of the case 10 is positively prevented.

In normal operation, when the case 10 is being correctly inserted into the apparatus 1, it contacts and presses against the contacting part 35 of the set lever 30, which is thereby rotated in the counterclockwise direction and, acting by way of the set spring 32, rotationally energizes the lock lever 28 in the counterclockwise direction. Since the elastic spring force of the set spring 32 is selectively made greater than that of the spring 34, the lock lever 28 is thus rotated in the counterclockwise direction, and the latch part 28*a* thereof reaches the path (position indicated by one-dot chain line in the figure) of movement of the lock pin 27, whereupon the lock mechanism 4 assumes its standby state.

When, with the lock mechanism 4 in this standby state, the slider 24 moves together with the case 10 in the $Y_2$ direction, the lock pin 27 comes into contact with the latch part 28*a* of the lock lever 28 and, overriding the same, engages with the lock lever 28, whereby the slider 24 becomes locked. Furthermore, when the lock pin 27 overrides the latch part 28*a*, it rotates the switch lever 29 in the clockwise direction. As a consequence, the switch arm 31*a* of the switch 31 is tilted to its right-hand position, whereupon the switch is closed. This switch closed position is set at that position coinciding with the completion of the engagement of the lock pin 27 with the lock lever 28. This closure of the switch 31 starts the aforementioned mechanism 5 for actuating the movable base 3, which mechanism 5 will be described more fully hereinafter. Thus, this mechanism 5 is started for the first time only when the case 10 has been correctly positioned in its loaded state, whereby accurate and positive operation can be carried out.

It is to be noted that even when the case 10 is inserted in an askew state relative to the slider 24, which correspondingly becomes askew, there is no possibility of a great positional misalignment since the lock pin 27 is at a central position of the slider 24, whereby the lock pin 27 positively engages the latch part 28*a* and is firmly locked.

The slider 24 is provided on its left and right parts with lock plates 24*d* and 24*e*, which will now be described with reference principally to FIGS. 1, 6(A), and 6(B). FIGS. 6(A) and 6(B) are partial sections taken along the plane indicated by line VI—VI in FIG. 1 as viewed in the arrow direction. The lock plates 24*d* and 24*e* are in the form of levers pivotally supported at their rear proximal ends (in the direction $Y_2$) by horizontal pivot shafts 33*a* and 33*b* provided on the slider 24 and, at their distal ends, support lock pins $\mathbf{24}_{d\text{-}1}$ and $\mathbf{24}_{e\text{-}1}$ inbeddedly fixed thereto. Coil springs 26*c* and 26*d* respectively, are stretched between the slider 24 and upper parts of the respective lock plates 24*d* and 24*e* and continually urge the lock plates 24*d* and 24*e* to rotate in the clockwise direction as viewed in FIGS. 6(A) and 6(B). Therefore, in their normal free state, these lock plates 24*d* and 24*e* assume the attitude shown in FIG. 6(A).

Referring to FIG. 4(B), in the bottom face of the case 10, on the left and right sides thereof near the leading edge thereof, lock holes 10*g* and 10*h* are formed at positions to receive the above described lock pins $\mathbf{24}_{d\text{-}1}$ and $\mathbf{24}_{e\text{-}1}$ of the lock plates 24*d* and 24*e*. When the lock plates 24*d* and 24*e* undergo rotational displacement, and their lock pins $\mathbf{24}_{d\text{-}1}$ and $\mathbf{24}_{e\text{-}1}$ fit in and become engaged with the lock holes 10*g* and 10*h* in the case 10, displacement of the case 10 in the $Y_1$-$Y_2$ directions is prevented.

The lock plates 24*d* and 24*e* function in the following manner. FIG. 6(A) indicates the state of these lock plates and related parts immediately after a case 10 has been inserted through the insertion slot 20 of the apparatus 1 and the leading edge face of the case 10 has abutted against the upright web part 24*b* of the slider 24. In this state, the lock plates 24*d* and 24*e* are in their positions to which they have been rotationally displaced in the clockwise direction and are in a retracted state within openings 2*a* formed in the fixed base 2. When, from this state, the case 10 is inserted further in the $Y_2$ directon, the slider 24 accompanying the case 10 also moves in unison therewith in the $Y_2$ direction. Then, as a consequence, the back or lower faces of the lock plates 24*d* and 24*e* come into contact with the rear rim parts $\mathbf{2}_{a\text{-}1}$ of the openings 2*a*, and the lock plates 24*d* and 24*e* are relatively rotated in the counterclockwise direction and placed in an energized state. In this state, as shown in FIG. 6(B), the lock pins $\mathbf{24}_{d\text{-}1}$ and $\mathbf{24}_{e\text{-}1}$ are inserted into and engaged with the lock holes 10*g* and 10*h* formed in the bottom of the case 10. The case 10 is thereby positively locked in its correct loaded position and thus prevented from undergoing inadvertent displacement in the $Y_1$-$Y_2$ direction. At the same time, the case 10 is prevented from accidently dropping or slipping out of the apparatus 1 in the $Y_1$ direction.

Furthermore, since the lock plates 24*d* and 24*e* are provided on the slider 24, even if the case 10 is inserted in an askew state, the slider 24 can undergo displacement with respect to the askewness of the case 10, whereby the lock pins $\mathbf{24}_{d\text{-}1}$ and $\mathbf{24}_{e\text{-}1}$ can fit into the lock holes 10*g* and 10*h* without fail.

The movable base 3 and the various parts associated therewith will now be described with reference principally to FIGS. 2 and 7. The movable base 3 at its rear end (in the $Y_2$ direction) is pivotally supported on the fixed base 2 but is disposed on the reverse or lower side of the fixed base. More specifically, as shown in FIG. 7, horizontal pivot pins 37*a* and 37*b* are fixedly supported on the fixed base 2 so as to project upward from the upper face thereof at positions near the left and right sides thereof. The movable base 3 is provided at its rear end with brackets 38*a* and 38*b* (shown also in FIG. 1) fixed thereto and pivotally connected to the pivot pins 37*a* and 37*b*. Thus, the movable base 3 is movable by swinging in the directions $B_1$-$B_2$ shown in FIG. 7 about the pivot pins 37*a* and 37*b*.

This movable base 3 is thus moved by the movable base actuating mechanism 5, described hereinafter, in the $B_1$ direction at the time of reproduction of a compact disc 9 and in the $B_2$ direction at the time of ejection of the case 10 out of the apparatus 1. Furthermore, since the pivot pins 37*a* and 37*b* constituting the axis of rotation of the movable base 3 are positioned, not in the plane of the movable base 3, but above the fixed base 2, the movable base 3 can assume a state wherein it is parallel and snugly close to the fixed base 2 after it has been displaced in the $B_1$ direction.

The aforementioned optical pickup 6 is fixed to the reverse face of an optical pickup base 39 and can be moved in the $Y_1$-$Y_2$ directions relative to the movable base 3 by the aforementioned optical pickup actuating mechanism 7 comprising the optical pickup base 39, a linear motor 42, and other parts. The optical pickup base 39 is slidably supported on parallel sliding rods 41*a* and 41*b* spanning an opening 40 formed in the movable base 3 and can be driven by the linear motor 42 to undergo movement in the $Y_1$-$Y_2$ directions as the optical pickup 6 reads out information recorded on the compact disc 9. Furthermore, a spindle motor 36 is mounted at a specific position on the movable base 3.

The aforementioned mechanism 5 for actuating the movable base 3 comprises essentially base pins 42*a* and 42*b* imbeddedly fixed to the end part in the $Y_1$ direction of the movable base 3 respectively at positions near the left and right sides thereof, a guide shaft 43 disposed across the fixed base 2 in the $X_1$-$X_2$ direction, an elevator member 44 slidably supported by way of brackets 49 and 50 on the guide shaft 43, and a motor 45 serving as a driving power source. The rotational power of the motor 45 is transmitted by way of gears 46 and 47 to a rack 48 fixed to the elevator member 44. Accordingly, depending on the rotational direction of the motor 45, the elevator member 44 is moved in either of the $X_1$, $X_2$ directions.

This motor 45 is started by the closing of the switch 31 (shown in FIG. 1) which occurs when the lock mechanism 4 assumes the locked state, that is, when the case has been loaded into its correct loaded position. The elevator member 44, which is in the form of a thin plate, is fixed at its left and right ends to the above mentioned brackets 49 and 50, through which the guide shaft 43 is passed. The bracket 50 also functions as one component of the aforementioned pickup displacement controlling mechanism 8 described hereinafter.

Figure 9:
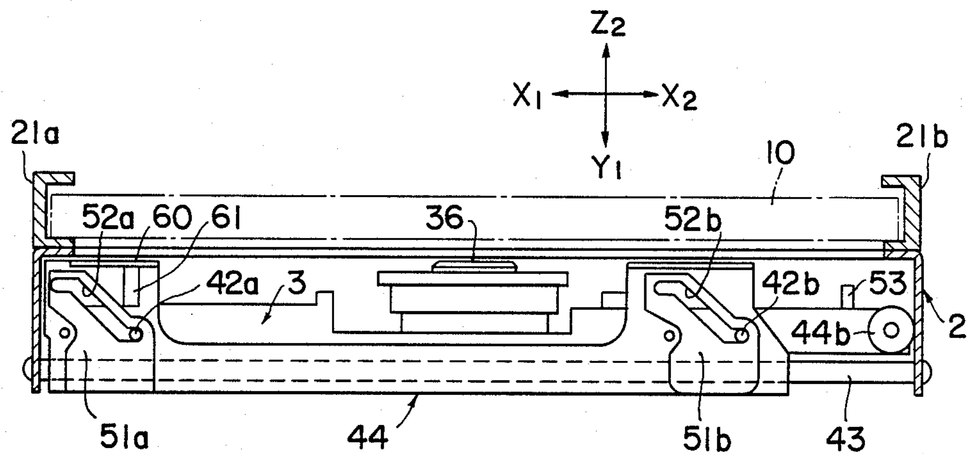
FIGS. 9 and 10 are rearward views for a description of displacements of an elevator member and the movable base.

A section taken in the plane indicated by line IX—IX in FIG. 2 is shown in FIG. 9, in which the rack 48 is not shown. As shown, resin plates 51*a* and 51*b* of good slidability, that is, low coefficient of friction, are respectively fixed to the left and right end parts of the elevator member 44 and are provided with cam slots 52*a* and 52*b* which are inclined leftward in the upward direction. In these cam slots 52*a* and 52*b* are engaged the aforementioned base pins 42*a* and 42*b* imbeddedly fixed to the movable base 3. The case wherein the motor 45 has started and elevator member 44 moves in the rightward direction $X_2$ will be considered. As the elevator member 44 thus moves in the $X_2$ direction, the base pins 42*a* and 42*b*, being guided by the cam slots 52*a* and 52*b*, undergo relative displacement upward along their inclined surfaces. As a consequence of this displacement, a force component is exerted on the movable base 3 urging it to move relatively in the $X_2$ direction. However, since a roller 44*b* is provided at the righthand side of the movable base 3, the movable base 3 can move smoothly up and down without being influenced by this force component.

Figure 8:
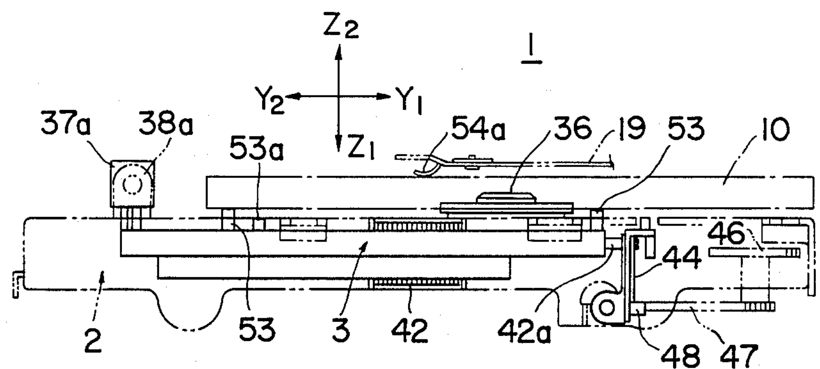
Figure 10:
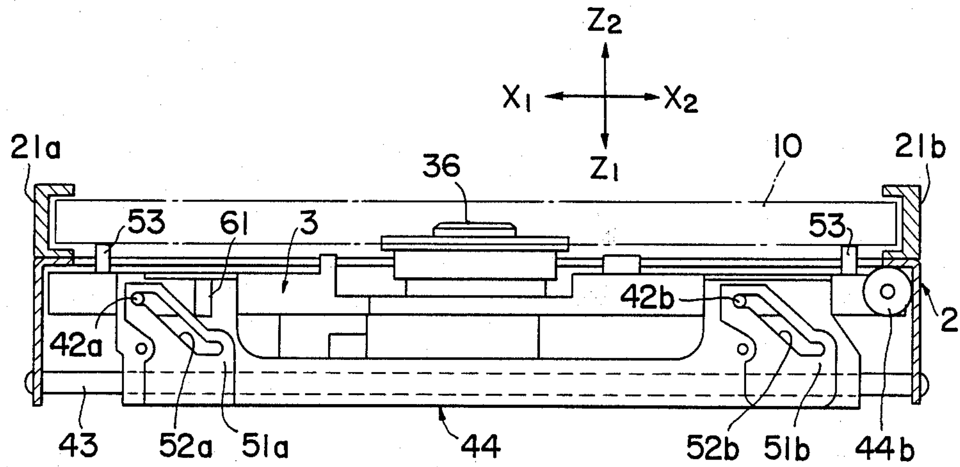

Consequently, the movable base 3 is swung in the direction $B_1$ in FIG. 7, and the optical pickup 6 and the spindle motor 36 mounted on the movable base 3 are moved toward the compact disc 9 contained in the case 10 loaded in the loaded position. Then, with the base pins 42*a* and 42*b* in their state of having reached the upper left ends of the cam slots 52*a* and 52*b*, the reproducing apparatus 1 assumes its state for starting reproduction, as shown in FIGS. 8 and 10, wherein the spindle motor 36 is in engagement with the compact disc 9 within the case 10, and moreover the optical pickup 6 is confronting the compact disc 9 with a specific spacing distance therebetween. As the apparatus 1 assumes this reproducing state, a projecting part 44*a* formed on the elevator member 44 actuates a switch 55 mounted on the fixed base 2, whereby the supply of electric power to the motor 45 is shut off, and the movement of the elevator member 44 stops.

As described above, by causing the case 10 containing the compact disc 9 to move horizontally in the $Y_1$ and $Y_2$ directions relative to the fixed base 2, the loading and ejecting of the case 10 are carried out. At the same time, the optical pickup 6, the spindle motor 36, and other parts are mounted on the movable base 3, which is pivotally supported on the fixed base 2 and is moved toward the compact disc 9 at the time of reproduction. By this structural organization, the spaces for movement of the various moving parts at the time of reproduction can be made small. Furthermore, because the pivotal axis of the movable base 3 is positioned above the upper face of the fixed base 2, the reproducing apparatus 1 can be made compact and thin.

A plurality of positioning projections 53 are provided on the upper surface of the movable base 3. As indicated in FIGS. 8 and 10, these projections 53 function when the apparatus is in its state of reproduction to abut against the bottom surface of the case 10 thereby to separate the case 10 from the fixed base 2 and the loading rails 21*a* and 21*b*. As is known, it is necessary to set with great precision the spacing distance between the optical pickup 6 and the compact disc at the time of reproduction. The positioning projections 53 are provided on the movable base 3, and the optical pickup 6 is also mounted on the movable base 3. Accordingly, by appropriately selecting the projecting dimensions of the positioning projections 53, the spacing distance between the case 10 (the compact disc 9) and the optical pickup 6 is automatically set when the positioning projections 53 push the case 10 up at the time of reproduction.

Furthermore, the loading cover 19 is provided at its rear edge, on its left and right sides, with leaf springs 54*a* and 54*b* for urging the case 10 downward in the $Z_1$ direction. As viewed in FIGS. 7 and 8, these leaf springs 54*a* and 54*b* are positioned approximately midway between the front and rear positioning pins 53 and serve also to maintain the above mentioned spacing distance. In addition, studs 53*a* and 53*b* are provided on the movable base 3 at left and right positions in the proximity of the positioning projections 53 near the pivot pins 37*a* and 37*b* and functions when the movable base 3 moves upward to press the lock plates 24*d* and 24*e* in the upward direction $Z_2$ (FIGS. 1 and 7). As a result, the slider 24 is locked by the engagment of the lock pin 27 and the lock lever 28 in the reproduction state, and at the same time the pressing action of the studs 53*a* and 53*b* causes the lock pins 24*d*-$_1$ and 24*e*-$_1$ imbeddedly fixed to the lock plates 24*d* and 24*e* to fit positively in the lock holes 10*g* and 10*h* formed in the case 10. Thus the case 10 is positively held in loaded position in the reproducing apparatus against any great outside force, and erroneous operation is prevented. With the apparatus in the above described reproduction state, the information recorded on the compact disc 9 is picked up and read by the optical pickup 6.

The operation at the time of ejection of the case 10 will now be described with reference principally to FIGS. 11 and 12, in which, for convenience in description, the loading cover 19 and the slider 24 shown in FIG. 1 have been deleted. The ejection operation is carried out principally by unlocking means comprising essentially a cam member 56, an unlocking bar 57, a canceling lever 58, and a canceling pin 59.

Figure 11:
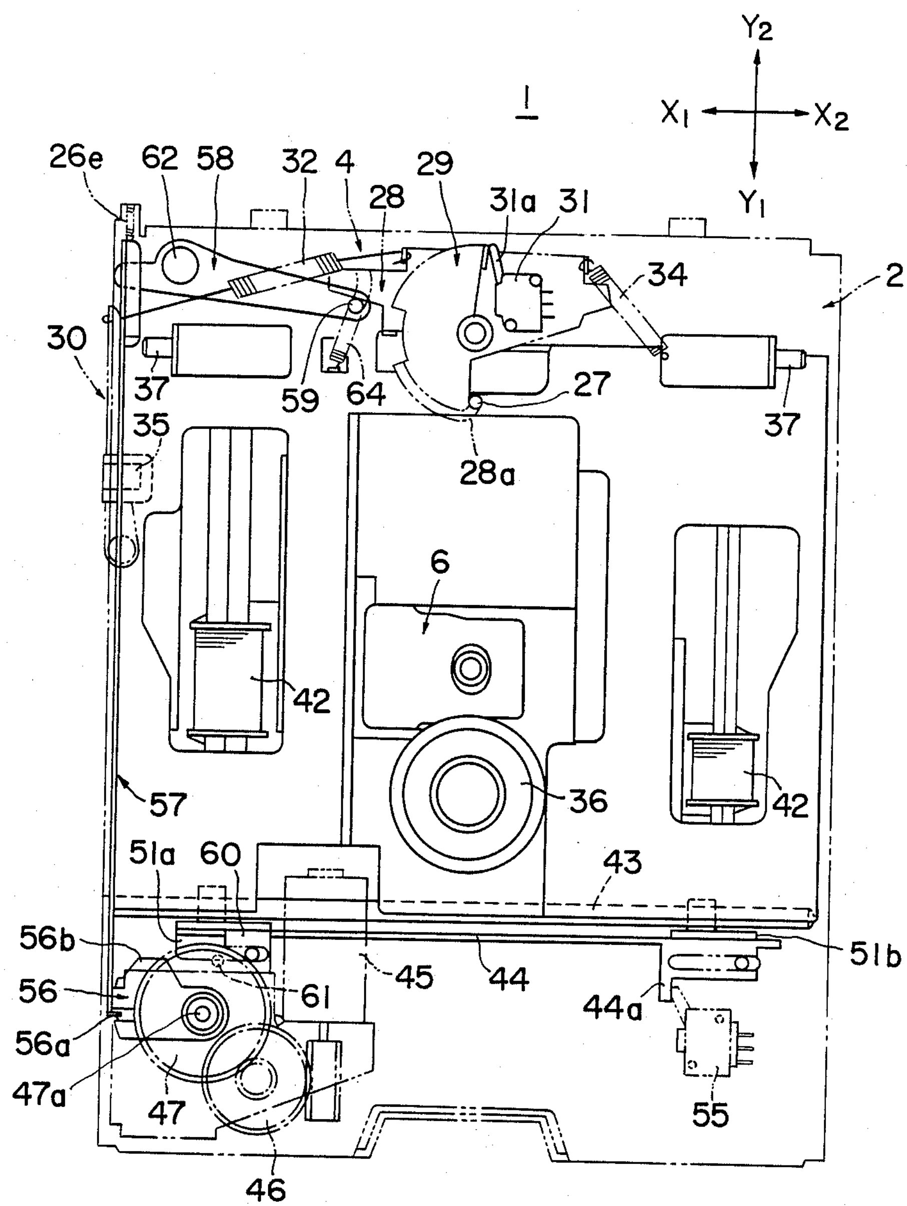
FIGS. 11 and 12 are top plan views of the reproducing apparatus, with a loading cover and a slider removed, for a description of unlocking means.
Figure 12:
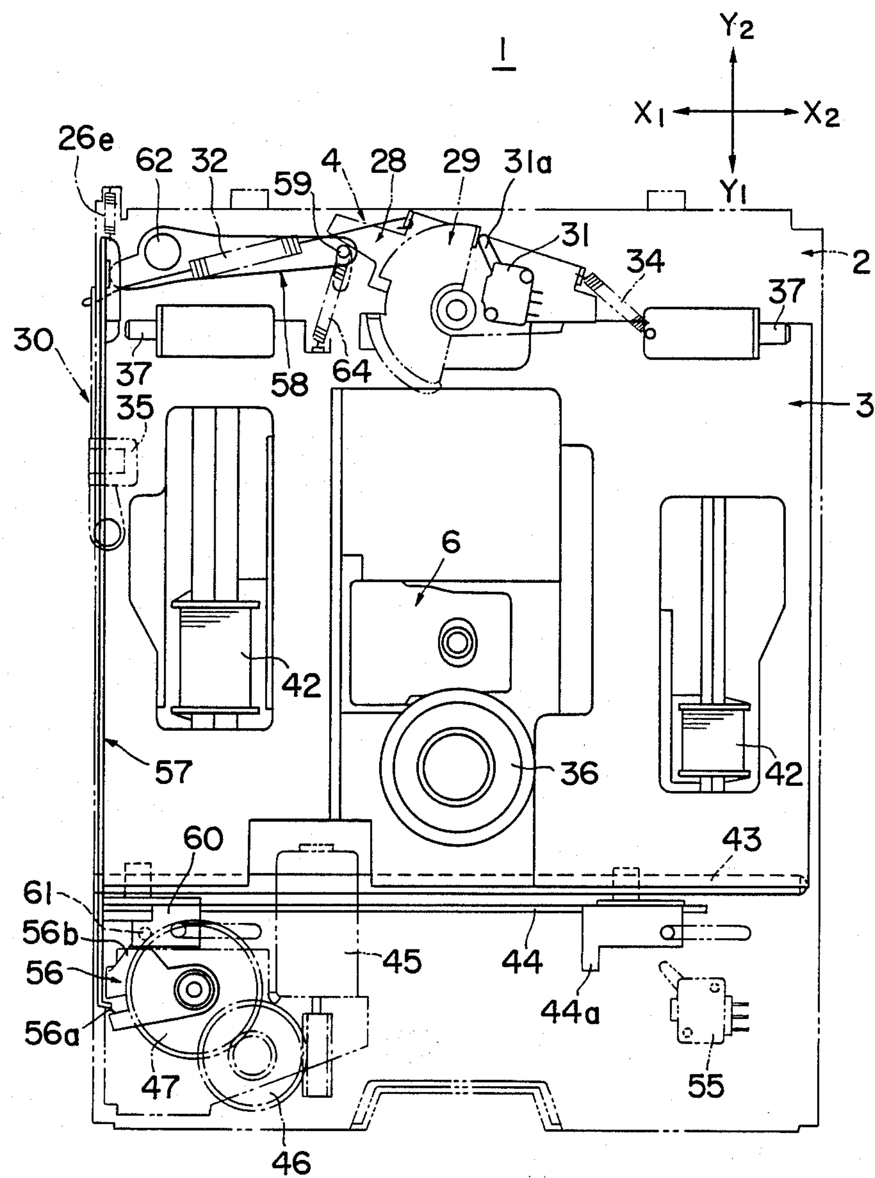

In FIG. 11, the reproducing apparatus is shown in its reproducing state, in which the elevator member 44 has moved in the $X_2$ direction, and moreover the lock pin 27 is engaged with the latch part 28*a* of the lock lever 28. A flange 60 is formed at the left end of the elevator member 44 (above the resin plate 51*a* in FIG. 9) and supports a cam-operating pin 61 imbeddedly fixed thereto. This cam-operating pin 61 moves in the $X_1$-$X_2$ directions together with the movements of the elevator member 44. The cam member 56 is supported on the shaft 47*a* of the gear 47 in a manner whereby it is coaxially rotatable with shaft 47*a* and has a slot 56*a* and a projecting part 56*b* formed therein. The projecting part 56*b* is adapted to engage with the above mentioned cam-operating pin 61.

The unlocking bar 57 extends in the $Y_1$-$Y_2$ directions along the left side of the apparatus 1, and its end in the $Y_1$ direction is engaged with the slot 56*a* of the cam member 56, while its end in the $Y_2$ direction is engaged with the canceling lever 58. Furthermore, a coil tension spring 26*e* is stretched between a rear part of the fixed base 2 and the rear end in the $Y_2$ direction of the unlocking bar 57 and exerts a force on the rear end of the unlocking bar 57 in the $Y_2$ and $Z_2$ directions. The canceling lever 58 is pivotally supported on a vertical pivot shaft 62 at the rear left side of the fixed base 2. The left end of this canceling lever 58 is engaged with the rear end of the unlocking bar 57, while the right end thereof supports the canceling pin 59 fixed uprightly thereto. This canceling pin 59 extends upwardly through an arcuate slot 63 formed in the fixed base 2 and, projecting above the upper surface of the fixed base 2, is engaged with the left end part of the lock lever 28. The canceling lever 58 is continually urged to rotate in the clockwise direction by a coil tension spring 64.

When, with the apparatus in its reproducing state indicated in FIG. 11, the operator operates an ejection switch (not shown), electric power is supplied to the motor 45, which drives the elevator member 44, by way of gears 46 and 47, and causes it to begin moving in the $X_1$ direction. This movement causes the cam-operating pin 61 to also move until it engages with and presses against the projecting part 56*b* of the cam member 56, which thereby rotates in the counterclockwise direction, and the unlocking bar 57 engaged with the slot 56*a* in the cam member 56 moves in the $Y_1$ direction. In this operation, when the cam-operating pin 61 begins to engage with projecting part 56*b* of the cam member 56, the movable base 3 is at its lowered position (as shown in FIG. 7), and the locked state of the slider 24 is being maintained by the engagement of the lock pin 27 and the lock lever 28.

When the unlocking bar 57 is thus moved in the $Y_1$ direction, the canceling lever 58 engaged therewith is rotated in the counterclockwise direction about the pivot shaft 62, as indicated in FIG. 16, and the canceling pin 59 urges the lock lever 28 to rotate in the clockwise direction. The lock lever 28 thereby rotates until its latch part 28*a* disengages from the lock pin 27, and the slider 24 is released from its locked state due to the lock mechanism 4. The slider 24 thus unlocked moves in the $Y_1$ direction under the force of the coil springs 26*a* and 26*b* (shown in FIG. 1). Furthermore, the lock plates 24*d* and 24*e* are also disengaged from the case 10, which is thereby ejected to assume a state wherein it is projecting a specific distance out of the insertion slot 20.

When the case 10 is in this ejected state, the unlocking bar 57 is still in its position of displacement in the $Y_1$ direction. Accordingly, the lock lever 28 is still in its position to which it has been rotated clockwise by the canceling pin 59. However, the set lever 30 has been returned to its state prior to operation by the removal of the case 10 (as indicated in FIG. 13). Therefore, even if the case 10 is again inserted in the $Y_2$ direction and the set lever 30 operates, the lock mechanism 4 will not assume its standby state.

The unlocking mechanism of the canceling lever 58 will now be considered. In the process wherein the slider 24 has been released from its locked state and is being moved in the $Y_1$ direction in FIG. 14 together with case 10 which is being ejected, when a pin 65 provided on the left front part of the slider 24 presses against a projecting part 57*a* of the unlocking bar 57, the engagement between the canceling lever 58 and a recess 57*b* formed in the rear end of the unlocking bar 57 is broken, and the canceling lever 58 is turned in the clockwise direction by the force of the spring 64. Then, as a result of the action of the set lever 30, the lock mechanism 4 again assumes its standby state as indicated in FIGS. 1 and 15.

As a result of the succeeding operation for actuating the movable base 3, that is, the movement of the elevator member 44 in the $X_2$ direction, the unlocking bar 57 permits the rotation of the cam member 56 and, under the force of the spring 26*e*, undergoes sliding movement to assume the state of engagement with the canceling lever 58, thereby making possible the succeeding ejection operation. When the lock pin 27 is released from its arrested state due to the lock mechanism 4, the switch lever 29 slides in the counterclockwise direction on the lock lever 28, and the switch 31 is opened. The supply of electric power to the motor 45 is stopped at the instant of this opening of the switch 31.

As described above, in the reproducing apparatus according to this invention, the case loading operation is carried out manually until the case has been inserted to a specific position, and, after the case has been loaded into the specific position and locking has been carried out positively by locking means, this is detected by locked state detecting means, whereupon, for the first time, the movable base driving means starts to operate. For this reason, if the case is not correctly loaded, the apparatus is prevented from assuming its reproducing state, and defective operation or trouble arising from erroneous insertion of the case (disc) (for example, the apparatus being placed in its reproducing state in spite of the absence of a disc in the case) can be positively prevented.

What is claimed is:

1. An apparatus for reproducing signals recorded on discs, comprising:

a fixed base;

a loading-ejecting mechanism provided on said fixed base and having a sliding member for engaging with a case wherein a disc is accommodated, and in which loading-ejecting mechanism, for reproducing signals recorded on the disc, said case is loaded into a specific loaded position by manual insertion of said case thereinto, and from which loading-ejecting mechanism, for ejection of said case after reproduction, said case is ejected by a movement of said sliding member;

a movable base having disc reproducing means including a pickup for reading information signals recorded on discs, said movable base further having disc driving means including a spindle motor for rotating discs, said movable base being pivotally supported relative to said fixed base by pivot pins;

movable base driving means for actuating said movable base, said movable base driving means operating, at the time of loading said case containing said disc, to actuate said movable base in pivotal displacement thereof relative said fixed base to a specific reproducing position thereby to cause said disc reproducing means to confront the disc within the case and to cause said disc driving means to engage the disc, and said movable base driving means further operating, at the time of ejection of the case containing said disc, to actuate the movable base in pivotal displacement thereof relative the fixed base to withdraw the movable base from said specific reproducing position;

locking and locked state detection means for operating, when the case reaches said specific loaded position, to engage and lock said sliding member thereby to prevent displacement of the case, said locking and locked state detection means operating to detect the state wherein the case has thus been positioned and locked in said specific loaded position and then to generate and transmit a starting signal to said movable base driving means, said locking and locked state detection means being provided with a set lever which set lever, when said case is being correctly inserted into said specific loaded position, is moved by the case into a position for permitting said locking and locked state detection means to operate, and which set lever, when the case has not been inserted, is in a free position to prevent locking of said sliding member even when the sliding member is pressed; and unlocking means for operating in unison with said movable base driving means at the time of case ejection to unlock said sliding member from the locked state thereof due to said locking and locked state detection means.

2. An apparatus for reproducing signals recorded on discs as claimed in claim 1 in which said loading-ejecting mechanism is provided with error prevention levers which, when said case is improperly or erroneously inserted for loading into said mechanism, engage arrestingly with the case thereby to prevent insertion thereof.

3. An apparatus for reproducing signals recorded on discs as claimed in claim 1 in which said sliding member is provided with lock plates having lock pins and being movable by the movement of the sliding member caused by the insertion of the case to thrust said lock pins into corresponding lock holes formed in the case thereby to lock the case and prevent displacement thereof relative to the sliding member.

4. An apparatus for reproducing signals recorded on discs as claimed in claim 1 in which a plurality of upright positioning projections are provided on said movable base and function, when the movable base is in said specific reproducing position, to abut against the case thereby to separate the case from the fixed base, and a plurality of leaf springs are provided to press the thus separated case firmly against the positioning projection, the positioning projections and the leaf springs thus functioning cooperatively to maintain the distance between said disc reproducing means and said disc within the case at a constant prescribed value.

5. An apparatus for reproducing signals recorded on discs, comprising:

a fixed base;

a loading-ejecting mechanism provided on said fixed base and having a sliding member for engaging with a case wherein a disc is accommodated, and in which loading-ejecting mechanism, for reproducing signals recorded on the disc, said case is loaded into a specific loaded position by manual insertion of said case thereinto, and from which loading-ejecting mechanism, for ejection of said case after reproduction, said case is ejected by a movement of said sliding member;

a movable base having disc reproducing means including a pickup for reading information signals recorded on discs, said movable base further having disc driving means including a spindle motor for rotating discs, said movable base being pivotally supported relative to said fixed base by pivot pins;

movable base driving means for actuating said movable base, said movable base driving means operating, at the time of loading said case containing said disc, to actuate said movable base in pivotal displacement thereof relative said fixed base to a specific reproducing position thereby to cause said disc reproducing means to confront the disc within the case and to cause said disc driving means to engage the disc, and said movable base driving means further operating, at the time of ejection of the case containing said disc, to actuate the movable base in pivotal displacement thereof relative the fixed base to withdraw the movable base from said specific reproducing position;

locking and locked state detection means for operating, when the case reaches said specific loaded position, to engage and lock said sliding member thereby to prevent displacement of the case, said locking and locked state detection means operating to detect the state wherein the case has thus been positioned and locked in said specific loaded position and then to generate and transmit a starting signal to said movable base driving means; and unlocking means for operating in unison with said movable base driving means at the time of case ejection to unlock said sliding member from the locked state thereof due to said locking and locked state detection means, said unlocking means including an unlocking bar provided at one end thereof with a recess, said unlocking means further including a canceling lever which at one end thereof is engageable with and disengageable from the recess of the unlocking bar, said unlocking bar and said canceling lever being operable in co-operation with said locking and locked state detection means and with said loading-ejecting mechanism to prevent the locking operation of said locking and locked state detection means when said case is interrupted from a complete ejection and is forced to be reloaded towards said specific loaded position.

* * * * *